(12) United States Patent
Dinh

(10) Patent No.: US 7,271,336 B2
(45) Date of Patent: Sep. 18, 2007

(54) ADJUSTABLE MOUNTING BRACKET ASSEMBLY FOR MOUNTING AN ELECTRICAL BOX

(75) Inventor: Cong Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/513,986

(22) Filed: Aug. 31, 2006

(65) Prior Publication Data

US 2007/0084617 A1 Apr. 19, 2007

Related U.S. Application Data

(63) Continuation-in-part of application No. 10/944,529, filed on Sep. 17, 2004.

(60) Provisional application No. 60/507,024, filed on Sep. 29, 2003, provisional application No. 60/561,641, filed on Apr. 13, 2004.

(51) Int. Cl.
*H01H 9/02* (2006.01)

(52) U.S. Cl. .............................. 174/58; 174/53; 174/57; 174/50; 220/3.2; 220/3.3; 248/906

(58) Field of Classification Search ............... 174/480, 174/481, 50, 53, 57, 58, 61, 496, 503, 54, 174/63; 220/3.2–3.9, 4.02; 248/27.1, 300, 248/56, 57, 68.1, 343, 205.7, 82, 201, 906; 439/535; 312/245

See application file for complete search history.

(56) References Cited

U.S. PATENT DOCUMENTS

| | | |
|---|---|---|
| 1,056,759 A | 3/1913 | Mallery |
| 1,288,024 A | 12/1918 | Kendig |
| 1,756,361 A | 4/1930 | Johnson |
| 1,774,934 A | 9/1930 | Mangin |
| 1,790,031 A | 1/1931 | Vaughn |
| 1,982,957 A | 12/1934 | Knell |
| 2,269,211 A | 1/1942 | Kuykendall |
| 2,314,408 A | 3/1943 | Knight |
| 2,486,764 A | 11/1949 | Singer |
| 2,881,924 A | 4/1959 | Kruse et al. |
| 2,990,172 A | 6/1961 | Gianotta |
| 3,038,020 A | 6/1962 | Winter et al. |
| 3,039,729 A | 6/1962 | Nagle, Sr. |
| 3,182,805 A | 5/1965 | Foster, Jr. et al. |
| 4,790,505 A | 12/1988 | Rose et al. |
| 4,832,297 A | 5/1989 | Carpenter |
| 4,964,525 A | 10/1990 | Coffey et al. |

(Continued)

*Primary Examiner*—Angel R. Estrada
(74) *Attorney, Agent, or Firm*—Hoffman & Baron, LLP

(57) ABSTRACT

An adjustable mounting bracket assembly for mounting an electrical box that includes: (a) a mounting bracket that includes a mounting plate having a first opening for receiving an electrical box and a rail having a first aperture; a mounting bracket attaching end; a mounting bracket mating end; a first pair of side walls and a pair of tabs; (b) an adapter plate that includes: a base plate having a track with a second aperture; an adapter plate attaching end; an adapter plate mating end; and a second pair of side walls; and (c) a fastener. The mounting bracket mating end slidably receives the adapter plate mating end and the first aperture in the rail aligns with the second aperture in the track. The fastener is inserted in the first and second apertures and tightened to secure the mounting bracket to the adapter plate.

25 Claims, 7 Drawing Sheets

U.S. PATENT DOCUMENTS

| | | |
|---|---|---|
| 5,009,383 A | 4/1991 | Chapman |
| 5,098,046 A | 3/1992 | Webb |
| 5,114,105 A | 5/1992 | Young |
| 5,224,673 A | 7/1993 | Webb |
| D342,938 S | 1/1994 | Cheatham |
| 5,288,041 A | 2/1994 | Webb |
| 5,330,137 A | 7/1994 | Oliva |
| 5,405,111 A | 4/1995 | Medlin, Jr. |
| 5,423,499 A | 6/1995 | Webb |
| 5,516,068 A | 5/1996 | Rice |
| 5,927,667 A | 7/1999 | Swanson |
| 5,931,425 A | 8/1999 | Oliva |
| 6,079,677 A * | 6/2000 | Daoud ........................ 248/201 |
| 6,095,462 A * | 8/2000 | Morgan ........................ 248/82 |
| 6,098,939 A | 8/2000 | He |
| 6,188,022 B1 | 2/2001 | He |
| 6,209,836 B1 | 4/2001 | Swanson |
| 6,384,334 B1 | 5/2002 | Webb |
| 6,545,214 B2 | 4/2003 | Russell et al. |
| 6,573,449 B2 | 6/2003 | Vrame |
| 6,590,155 B2 | 7/2003 | Vrame et al. |
| 6,723,918 B2 | 4/2004 | Vrame |
| 6,765,146 B1 | 7/2004 | Gerardo |
| 6,803,521 B2 * | 10/2004 | Vrame ........................ 174/58 |
| 6,871,827 B2 * | 3/2005 | Petak et al. .................. 248/300 |
| 6,967,284 B1 * | 11/2005 | Gretz ........................ 174/58 |
| 6,996,943 B2 | 2/2006 | Denier et al. |

* cited by examiner

ADJUSTABLE MOUNTING BRACKET ASSEMBLY FOR MOUNTING AN ELECTRICAL BOX

This application is a continuation-in-part application of application Ser. No. 10/944,529, filed on Sep. 17, 2004, which claims priority from U.S. Provisional Application No. 60/507,024, filed on Sep. 29, 2003, and U.S. Provisional Application No. 60/561/641, filed on Apr. 13, 2004, all of which are incorporated herein in their entirety.

FIELD OF THE INVENTION

This invention pertains to an adjustable mounting bracket assembly for mounting electrical boxes within walls, floors or ceilings and, more particularly, to an adjustable mounting bracket assembly employing a mounting bracket to which one or more electrical boxes are secured and an adapter plate which adjustably receives the mounting bracket.

BACKGROUND OF INVENTION

There are many different methods used to secure electrical boxes to the walls, floor or ceilings of a structure, such as a building. When studs are used to frame the structure, the most common method used is to secure the box directly to the stud. The advantage of this method is that installation is quick and simple. However, there is no guarantee that all the boxes installed in this fashion will be the same height off the floor. Also, there is no guarantee that all the boxes will be positioned at the same depth within the wall cavity. This is important so that any dry-wall ring or other device subsequently secured to the box will fit properly on the surface of the wall material.

However, if the architectural plans call for the box or boxes to be mounted some distance from a stud, then methods requiring direct stud-mounting cannot be employed. In such cases, a bracket is required in order to support the box at some distance from the stud. There are basically two different types of brackets used for this type of application, either horizontal wall-mounted brackets or vertical floor-mounted brackets. In either case, once a particular electrical box size is selected and secured to the bracket, the installer is limited to using only a correspondingly sized dry-wall ring or other cover attachment.

Many different designs of floor-mounted and wall-mounted brackets are known and they typically are designed for mounting vertically with one end attached to the sole plate of a wall or between studs with standard center-to-center dimensions. Therefore, a user may have to stock several different sizes of brackets to accommodate different center-to-center dimensions. This is an added expense for the user. Moreover, when a bracket is mounted between studs having non-standard center-to-center dimensions, the user may have to add additional framing before he can install the bracket. Adjustable brackets that have been used in the past do not have the strength and rigidity of non-adjustable brackets and, therefore, have not been widely used.

Accordingly, it is an object of the present invention to provide a bracket (which can be either floor-, wall- or ceiling-mounted) for mounting electrical boxes between structural supports within the walls, floor or ceilings of a building that overcomes this deficiency. One object of this invention is to provide an adjustable mounting bracket assembly that is simple in construction and easy to install between studs having a variety of different center-to-center dimensions. Another object of this invention is to provide an adjustable mounting bracket assembly that has adequate strength and rigidity for supporting one or more electrical boxes.

SUMMARY OF THE INVENTION

In accordance with the present invention, an adjustable mounting bracket assembly for mounting an electrical box is provided. The adjustable mounting bracket assembly includes: (a) a mounting bracket that includes a substantially flat mounting plate having a first pair of opposing sides, a first opening for receiving an electrical box and a rail having a first aperture; a mounting bracket attaching end; a mounting bracket mating end; and a first pair of opposing sides having a first pair of side walls, wherein the first pair of side walls extend downwardly from the opposing sides of the mounting plate to a pair of edges; (b) an adapter plate that includes: a substantially flat base plate having a pair of opposing sides and a track having a second aperture; an adapter plate attaching end; an adapter plate mating end; and a second pair of side walls extending downwardly from the opposing sides of the base plate; and (c) a fastener. The mounting bracket mating end slidably mates with the adapter plate mating end so that the first aperture in the rail aligns with the second aperture in the track. The fastener is inserted in the first and second apertures and tightened to secure the mounting bracket to the adapter plate.

The rail preferably extends substantially between the first mating end and the first opening in the mounting plate for receiving an electrical box and the track preferably extends substantially between the second mating end and the adapter plate attaching end of the adapter plate. Although shorter rails and tracks are within the scope of the present invention, it has been found advantageous to maximize the lengths of the rail and track in order to provide maximum adjustability of the distances between the opposing ends of the adjustable mounting bracket assembly. In preferred embodiments, the rail is formed by a first depression in the mounting plate and the track is formed by a second depression in the adapter plate. When the mounting bracket slidably receives the adapter plate, the first depression corresponds to the second depression so that the track slidably receives the rail and the first aperture in the rail aligns with the second aperture in the track.

The first aperture in the rail can be a round hole or a slot and the second aperture in the track can also be a round hole or a slot. Preferably, the first aperture in the rail is a slot and the second aperture in the track is a round hole, or the first aperture in the rail is a round hole and the second aperture in the track is a slot. The fastener can include only a screw when the second aperture is a round hole with internal threads for receiving the screw. In preferred embodiments, the fastener includes a screw or a bolt and a nut. In some embodiments, the nut is attached to the base plate and aligned with the second aperture in the base plate.

The mounting plate can include an opening for a second electrical box and a plurality of mounting hole apertures for securing the electrical box to the mounting plate. Typically, the openings for the electrical boxes are located in the central portions of the mounting plate and are spaced a sufficient distance apart so that the structural strength of the mounting plate is maintained. The structural strength of the mounting plate is augmented by the side walls which stiffen the mounting plate and resist twisting under the weight of the electrical boxes.

The mounting bracket attaching end can include one or more bracket mounting apertures for attaching the mounting bracket to a first structure and the adapter plate attaching end can include one or more adapter plate mounting apertures for attaching the adapter plate to a second structure. In preferred embodiments, the second attaching end on the adapter plate has an adapter plate end wall extending downwardly from the adapter plate. This end wall is particularly useful when the adjustable mounting bracket assembly is used in a vertical configuration and the end wall is inserted under the sole plate of a framed wall. Once the adapter plate is attached to a sole plate the mounting bracket can be adjusted so that the opening for the electrical box (or boxes) is at the desired elevation. The attaching end of the mounting bracket, which extends beyond the side walls of the mounting bracket, is then attached to a stud or a horizontal member.

In another embodiment, the mounting plate has a first top surface and a first bottom surface and the rail extends downwardly from the first bottom surface and forms a first depression in the first top surface. Correspondingly, the adapter plate has a second top surface and a second bottom surface and the track extends downwardly from the second bottom surface and forms a second depression in the second top surface. The rail and track are dimensioned so that the rail is slidably received by the track when the mounting bracket slidably receives the adapter plate.

The mounting bracket can also include a pair of tabs which extend inwardly from the edges of the side walls. The tabs in cooperation with the side walls and the mounting plate form a pair of C-shaped openings for receiving the side walls of the adapter plate. In some embodiments, more than one pair of tabs is provided for slidably receiving the side walls of the adapter plate. In other embodiments, the tabs extend substantially from the mating end of the mounting plate to the first electrical box opening. For embodiments wherein the mounting bracket is slidably inserted into the adapter plate, the side walls of the adapter plate extend to form a pair of edges and a pair of tabs extend inwardly from the edges. The tabs in cooperation with the adapter plate side walls and the base plate form a pair of C-shaped openings for receiving the side walls of the mounting bracket.

In another preferred embodiment, the substantially flat base plate is in a first plane and the adapter plate attaching end has a substantially flat surface in a second plane. The first plane and the second plane are parallel and the base plate is connected to the adapter plate attaching end by a connecting wall, which offsets the base plate from the adapter plate attaching end. This offset between the base plate and adapter plate attaching end results in the adapter plate attaching end and the mounting bracket attaching end being in the same plane.

BRIEF DESCRIPTION OF THE FIGURES

The preferred embodiments of the adjustable mounting bracket assembly for mounting electrical boxes of the present invention, as well as other objects, features and advantages of this invention, will be apparent from the following detailed description, which is to be read in conjunction with the accompanying drawings wherein.

DETAILED DESCRIPTION OF THE INVENTION

Figure 1:
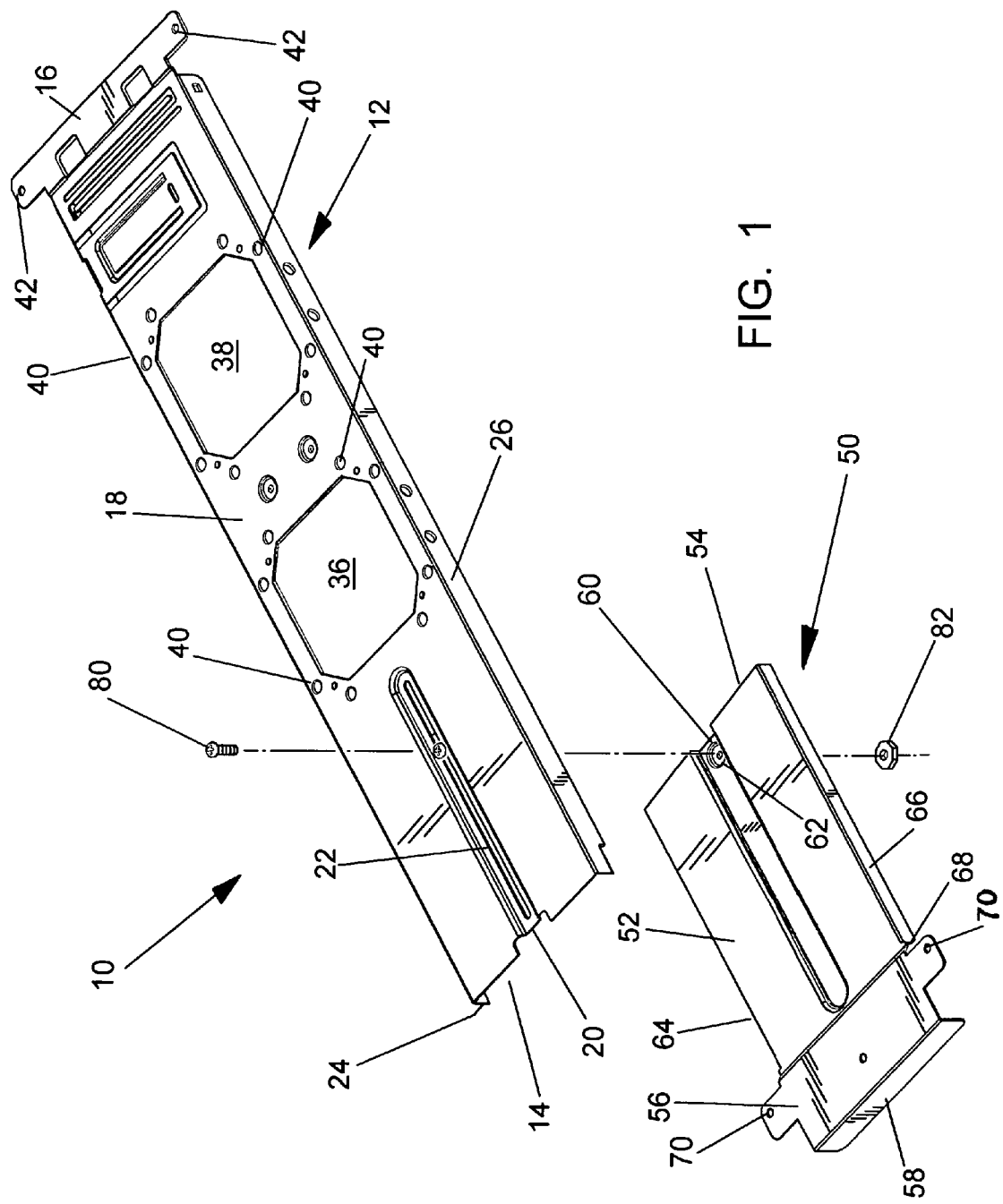
FIG. 1 is a perspective, exploded view of the adjustable mounting bracket assembly, including the mounting bracket and the adapter plate.

The present invention is directed to an adjustable mounting bracket assembly for mounting electrical boxes to a structure. In many cases when an electrical box is mounted in a wall, floor or ceiling, the location selected for the electrical box is not adjacent to a structure that can support the electrical boxes. In these cases, the electrical box is installed in a mounting bracket which is then attached to one or more structural supports. The adjustable bracket assembly of the present invention can be adjusted to vary the distance between the opposing ends so that a single bracket assembly can be used for multiple applications. The adjustable bracket assembly includes a mounting bracket and an adapter plate that are slidably joined to allow the distance between the opposing ends to be adjusted to correspond to different structures.

The adjustable bracket assembly is intended to be attached to wood or metal wall studs in either a horizontal or vertical configuration. When the adjustable mounting bracket assembly is mounted in a horizontal configuration, it is usually attached between two adjacent studs. When the adjustable mounting bracket assembly is mounted in a vertical configuration, the adapter plate attaching end is preferably attached to the toe plate at floor level and the mounting bracket attaching end is attached to a stud or a horizontal member connected between two adjoining wall studs. However, the adjustable mounting bracket assembly is not limited to these applications and it can be attached to almost any wall, floor or ceiling structure. Typically, when the adjustable mounting bracket assembly is attached to a wood frame structure, nails or screws are used and, when it is attached to a metal frame structure, screws or bolts are used. However, the adjustable bracket assembly of the present invention is not limited in any way by the type of structure to which it is attached nor by the type of hardware that is used to attach it to the structure.

The adjustable mounting bracket assembly includes a mounting bracket, an adapter plate and a fastener that secures the mounting bracket to the adapter plate. The mounting bracket has a length defined by two ends, a width defined by a pair of side walls and a substantially flat mounting plate having a rail and one or more openings for receiving electrical boxes. One end of the mounting bracket is attached to a first structure and the second end mates with the adapter plate. As used in the present invention, the terms "mate" and "mating" refer to the joining of the mounting bracket and the adapter plate by inserting or slidably inserting the adapter plate into the mounting bracket, as described in more detail below. It is also within the scope of the present invention for the dimensions of the components of the assembly to be changed so that the mounting bracket can be inserted into the adapter plate. In these embodiments, the side walls of the adapter plate have a pair of tabs instead of the side walls of the mounting bracket.

The rail is an elongated structure located, preferably, in the central portion of the mounting plate and it extends at least a part of the distance between the mating end and the electrical box opening closest to the mating end. The rail has an aperture that extends through the mounting plate. In a preferred embodiment, the rail is formed by a metal stamping operation that forms a depression in the mounting plate. The depression has side walls and, preferably, a substantially flat bottom. The aperture is in the bottom of the depression and it can be a round hole or a slot that extends substantially the entire length of the depression.

The adapter plate has a length defined by two ends, a width defined by a pair of side walls and a substantially flat base plate having a track. One end of the adapter plate is attached to a second structure and the second end mates with the mounting bracket. The track is an elongated structure that is located and dimensioned so that it slidably receives the rail when the mounting bracket and adapter plate are mated together. The track has an aperture located so that it corresponds to the aperture in the rail when the adapter plate and mounting bracket are joined together. After the adapter plate is slidably received by the mounting bracket, the two apertures are in alignment and the fastener passes through the two apertures and is tightened to secure the adapter plate to the mounting bracket. The fastener can include a screw and a nut or an internal screw thread can be formed in one of the apertures, preferably in the adapter plate aperture, using a tap so that only a screw is required. The fastener can include other variations that would be known to those skilled in the art, such as wing nuts, washers, split washers and bolts in place of screws.

The mounting bracket and the adapter plate of the adjustable bracket assembly are preferably made from metal, most preferably steel or aluminum. The components of the adjustable bracket assembly can be made using a metal stamping process or other fabrication methods well known to those skilled in the art of metal working. The most preferred method is a metal stamping process that stamps the rail and the track into the mounting plate and base plate, respectively, and forms the side walls of the mounting bracket and adapter plate. The adjustable bracket assembly can also be made from a thermoplastic material and formed using well known extrusion or molding processes.

The invention is now described in more detail with reference to the drawings. FIG. 1, which shows an exploded view of an adjustable mounting bracket assembly 10 that includes a mounting bracket 12, an adapter plate 50 and a screw 80 and nut 82 fastener. In some embodiments, the aperture 62 in the adapter plate 50 is tapped so that a nut 82 is not needed. The mounting bracket 12 has an attaching end 16, which is used to attach the mounting bracket 12 to a first structure (see FIG. 7A) and a mating end 14 that slidably receives the adapter plate 50. The mounting bracket 12 also includes a mounting plate 18 that has two openings 36, 38 for receiving an electrical box 96 (see FIG. 2) and a pair of side walls 24, 26, which extend downwardly from the mounting plate 18 to a pair of edges 28, 30 (see FIG. 3). FIG. 1 shows two openings 36, 38 for duplex electrical boxes. However, the present invention contemplates more than two openings 36, 38 and that the openings can be sized to receive electrical boxes having a variety of sizes so that the invention is not limited to an electric box having a specific size. The mounting plate 18 further includes a rail 20 which extends substantially the entire distance from the mating end 14 to the first electrical box opening 36. The rail 20 has an aperture 22 in its central portion for receiving a screw 80 which is used to fasten the mounting bracket 12 to the adapter plate 50. The mounting bracket 12 has one or more bracket mounting apertures 42 for attaching the bracket 12 to a structure 92 (see FIGS. 7A and 7B) and a plurality of electrical box mounting apertures 40 for securing the electrical boxes to the mounting plate 18.

Figures 7A, 7B:
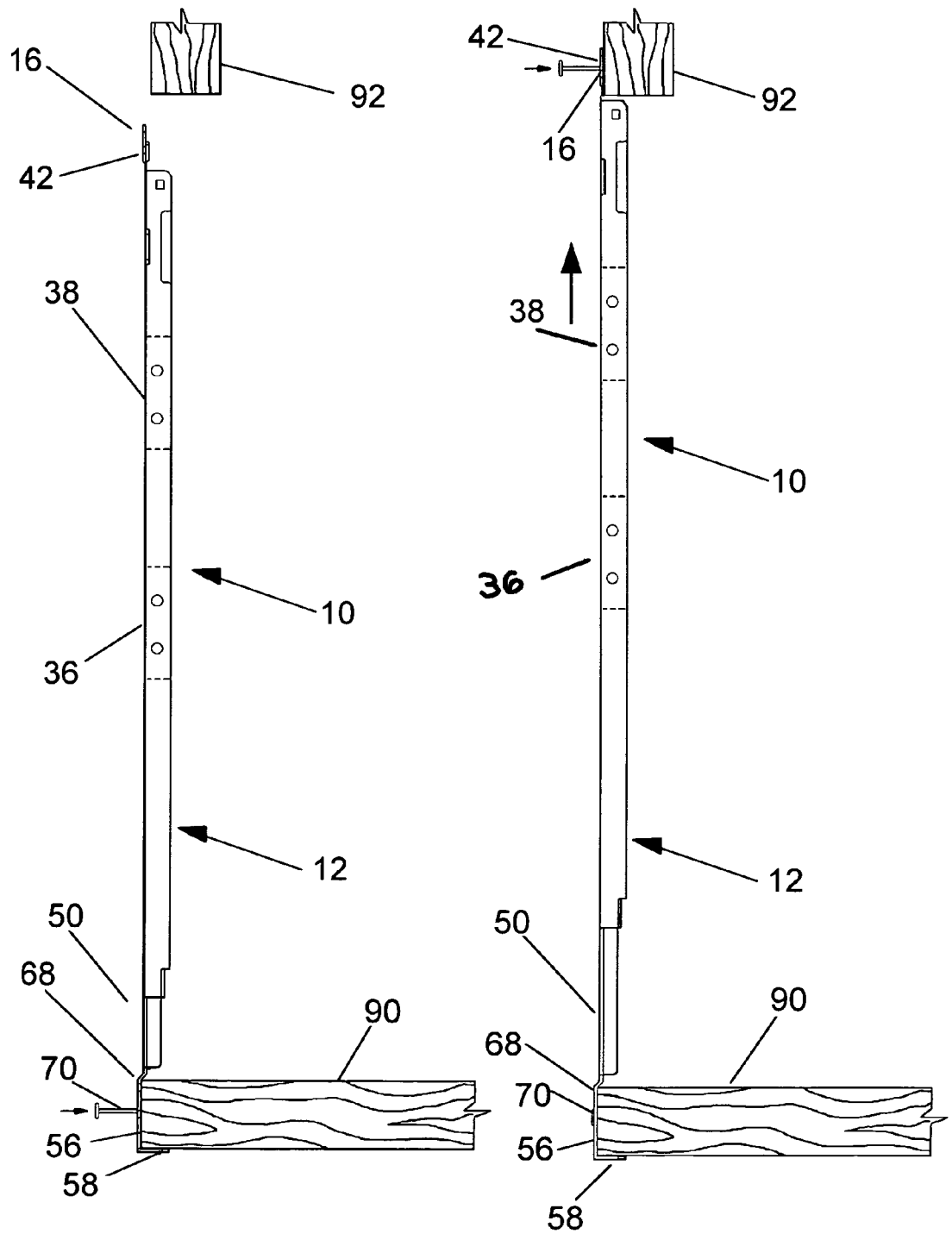
FIG. 7A and 7B are side views of the adjustable mounting bracket assembly at it is attached in a vertical configuration.

The adapter plate 50 includes a base plate 52, a mating end 54 that is received by the mounting bracket 12 and an attaching end 56 for attaching the adapter plate 50 to a second structure 92 (see FIG. 7B). A track 60 in the central portion of the base plate 52 extends from the mating end 54 towards the attaching end 56. The track 60 has a substantially round aperture 62 for receiving the fastening screw 80 which first passes through the aperture 22 in the rail 20. After the screw 80 passes through the rail aperture 22 and the track aperture 62, it engages a nut 82, which can be tightened to fixedly secure the mounting bracket 12 to the adapter plate 50. The base plate 52 is offset from and connected to the attaching end 56 of the adapter plate 50 by a connecting wall 68 so that the surface of the base plate 52 is parallel to and below the surface of the attaching end 56. The attaching end 56 of the adapter plate 50 has an end wall 58 that extends downwardly from the attaching end 56. The attaching end 56 for the adapter plate 50 has one or more adapter plate mounting apertures 70 for attaching the adapter plate 50 to a structure 90 (see FIGS. 7A and 7B).

Figure 2:
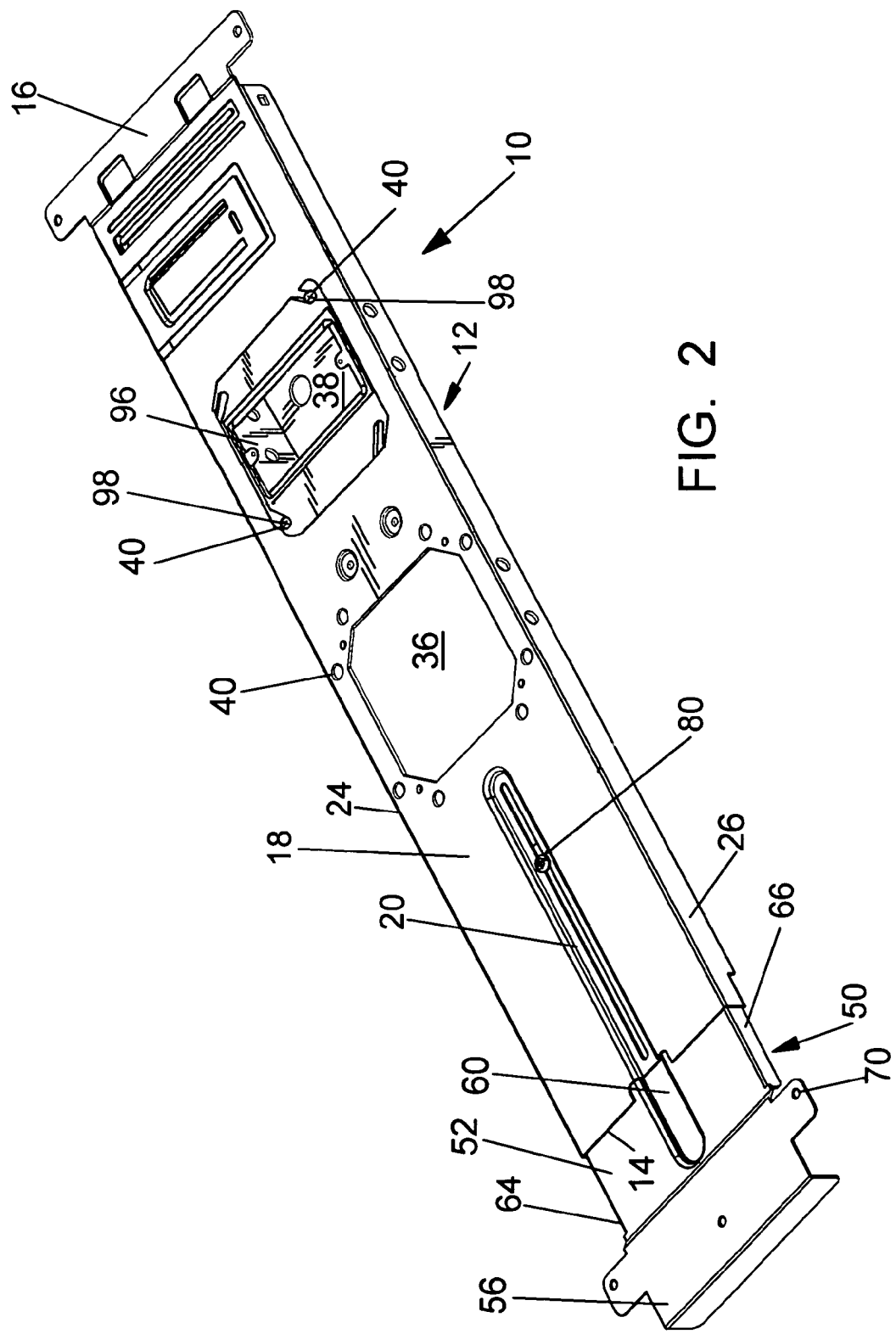
FIG. 2 is a top perspective view of the adjustable mounting bracket assembly with the mounting bracket connected to the adapter plate.

FIG. 2 is a top perspective view of the adjustable mounting bracket assembly 10 and it shows the mounting bracket 12 slidably receiving the adapter plate 50. The mounting bracket's opposing side walls 24, 26 (see FIG. 3) receive the adapter plate's opposing side walls 64, 66 and the adapter plate track 60 slidably receives the rail 20 on the mounting bracket 12. An electrical box 96 is shown in opening 38. Screws 98 are inserted in apertures 40 to secure the electrical box 96 to the mounting plate 18.

In the embodiment shown in FIG. 2, the rail 20 extends substantially the entire distance from the mating end 14 of the mounting bracket 12 to the first opening 36 for an electrical outlet box. The length of the rail 20 can vary and, as the length of the rail 20 increases, the adjustable distance between the opposing ends 16, 56 of the assembly 10 increases. The rail 20 shown in FIG. 2 has an aperture 22 in the form of a slot, which extends substantially the entire length of the rail 20, and is formed by a depression in the mounting plate 18. The dimensions of the rail 20 are selected so that when the screw 80 is inserted in the aperture 22, the head of the screw 80 is below the surface of the mounting plate 18 and can be rotated and moved freely in the slot 22 along the length of the rail 20.

Figure 3:
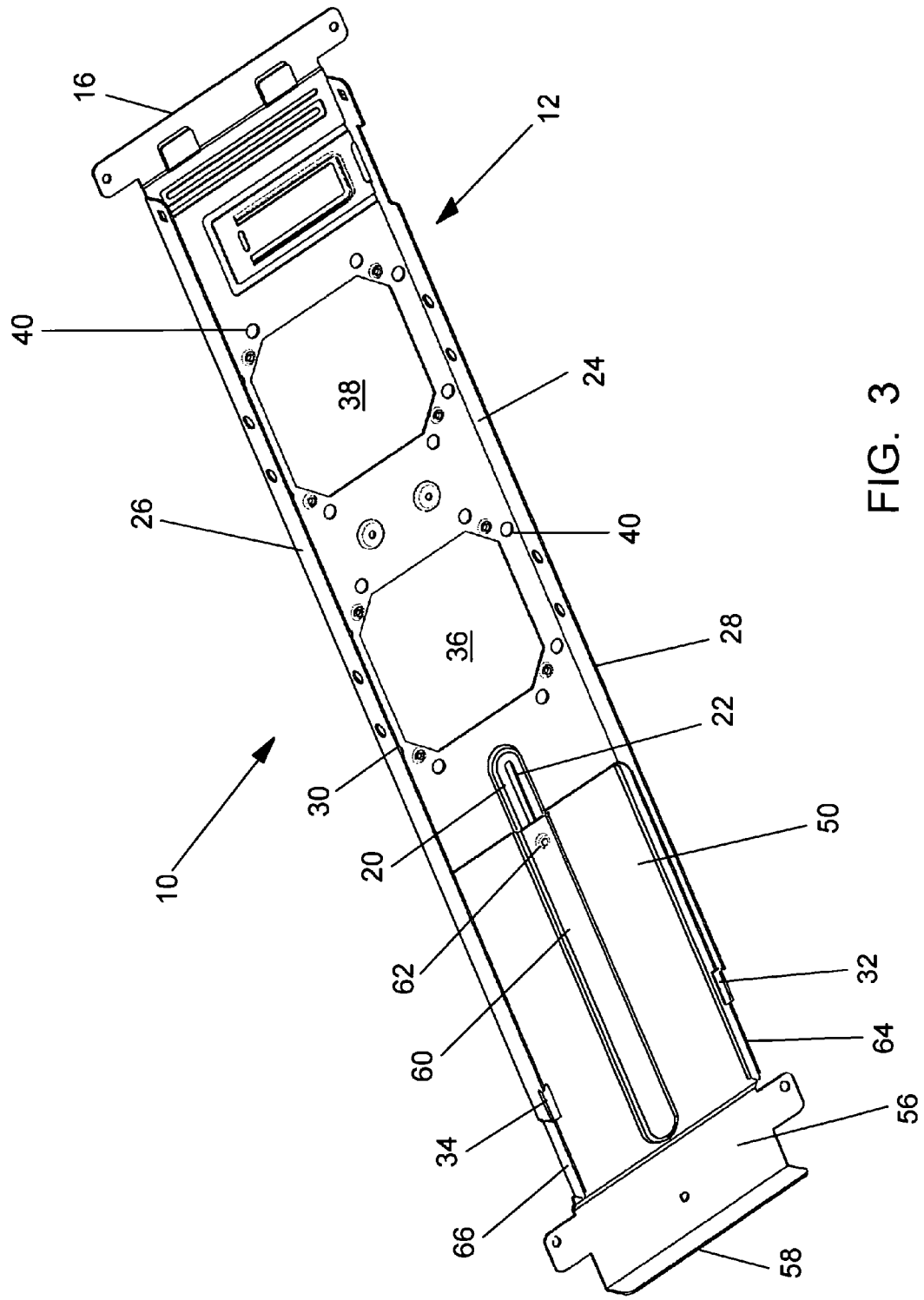
FIG. 3 is a bottom perspective view of the adjustable mounting bracket assembly with the mounting bracket connected to the adapter plate.

After the adjustable mounting bracket assembly 10 is mounted on the mounting bracket attaching end 16 and the adapter plate attaching end 56 to two structures 90, 92 (see FIG. 7B), such as adjoining wall studs, the fastening screw 80 is inserted into the rail aperture 22 and the track aperture 62 (see FIG. 3). Tightening the fastening screw 80 and nut 82 secures the mounting bracket 12 to the adapter plate 50 in a fixed position. The adjustable mounting bracket assembly 10 can be mounted in a horizontal configuration, wherein the attaching ends 16, 56 are attached to adjacent wall studs, or it can be mounted in a vertical configuration, wherein the adapter plate attaching end 56 is attached to a sole plate (also referred to as a bottom plate) of a framed wall structure and the mounting bracket attaching end 16 is attached to a horizontal member.

FIG. 3 is a bottom perspective view of the adjustable mounting bracket assembly 10 with the mounting bracket 12 mated with the adapter plate 50. The opposing side walls 24, 26 of the mounting bracket 12 slidably receive the opposing side walls 64, 66 of the adapter plate 50 and the track 60 slidably receives the rail 20. The opposing side walls 24, 26 of the mounting bracket 12 extend substantially perpendicularly from the mounting plate 18 to form a pair of edges 28, 30. A pair of tabs 32, 34 extend inwardly from the edges 28, 30. The tabs 32, 34 shown in FIG. 3 are located near the mating end 14 (see FIG. 1) of the mounting plate 18 and extend for only a short distance along the edges 28, 30. However, it is within the scope of the present invention for the tabs 32, 34 to extend either the entire length of the edges 28, 30 or up to the opening 36 for the electrical box. It is also within the scope of the invention for more than one pair of tabs to be included. The tabs 32, 34 together with the opposing side walls 24, 26 and the mounting plate 18 form a C-shaped opening that slidably receives the opposing side walls 64, 66 of the adapter plate 50.

Figure 4:
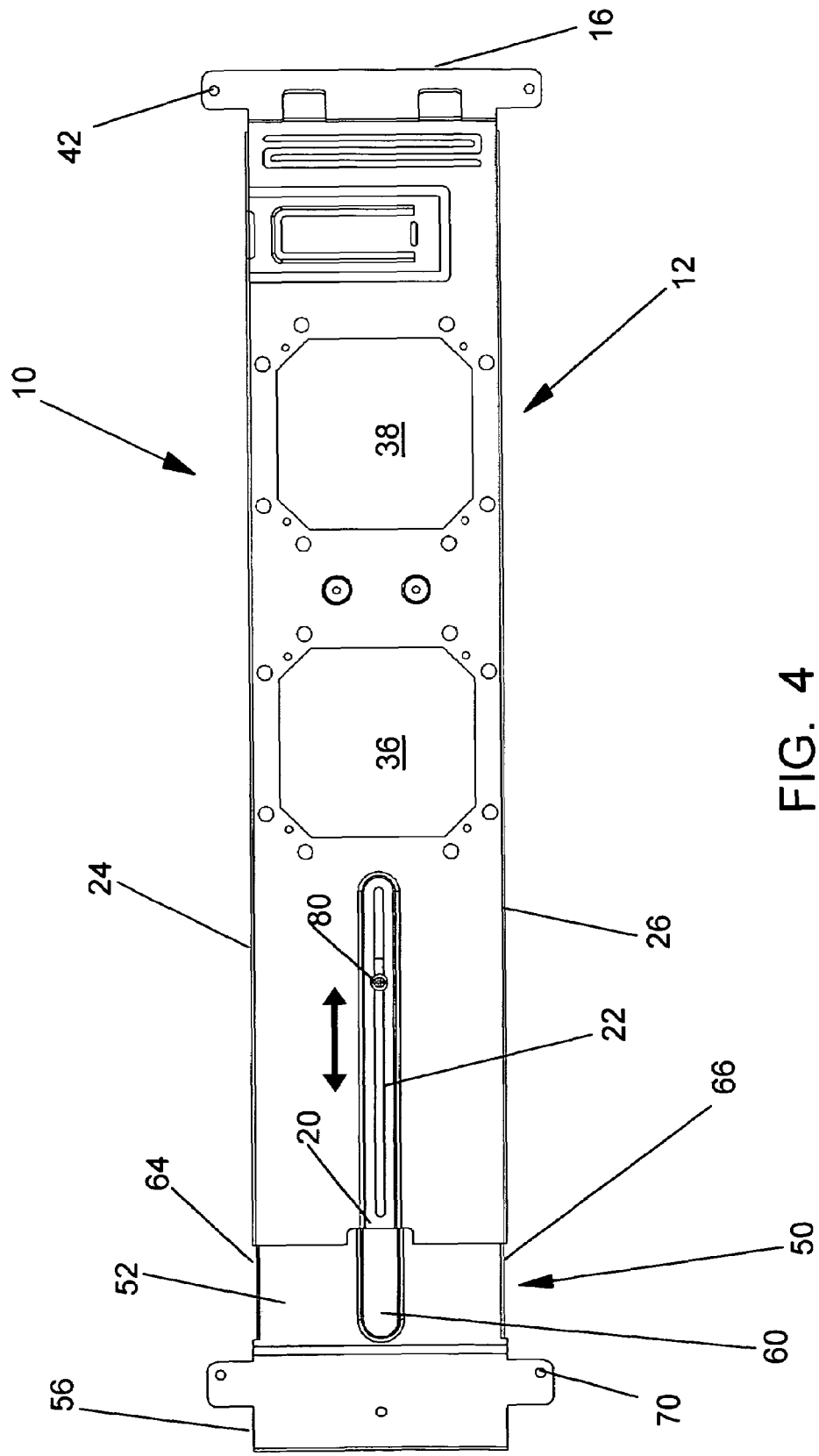
FIG. 4 is a top view of the adjustable mounting bracket assembly with the mounting bracket connected to the adapter plate.

FIG. 4 is a top view of the adjustable mounting bracket assembly 10 with the adapter plate 50 slidably inserted in the mounting bracket 12 and fastening screw 80 tightened to secure the adapter plate 50 to the mounting bracket 12. After the adapter plate attaching end 56 and the mounting bracket attaching end 16 are attached to two structures, electrical boxes can be mounted in the two openings 36, 38. When the adjustable mounting bracket assembly 10 is used in an application that requires a vertical orientation, the adapter plate attaching end 56 is attached to a sole plate and the mounting bracket 12 is adjusted so that the electrical box openings 36, 38 are at the desired elevation. The fastening screw 80 is then tightened to lock the mounting bracket 18 at the desired elevation and the mounting bracket attaching end 16 is attached to a stud. In another application, a horizontal member is installed between two adjoining wall studs and the mounting bracket attaching end 16 is attached to the horizontal member to complete the installation of the adjustable mounting bracket assembly 10.

Figure 5:
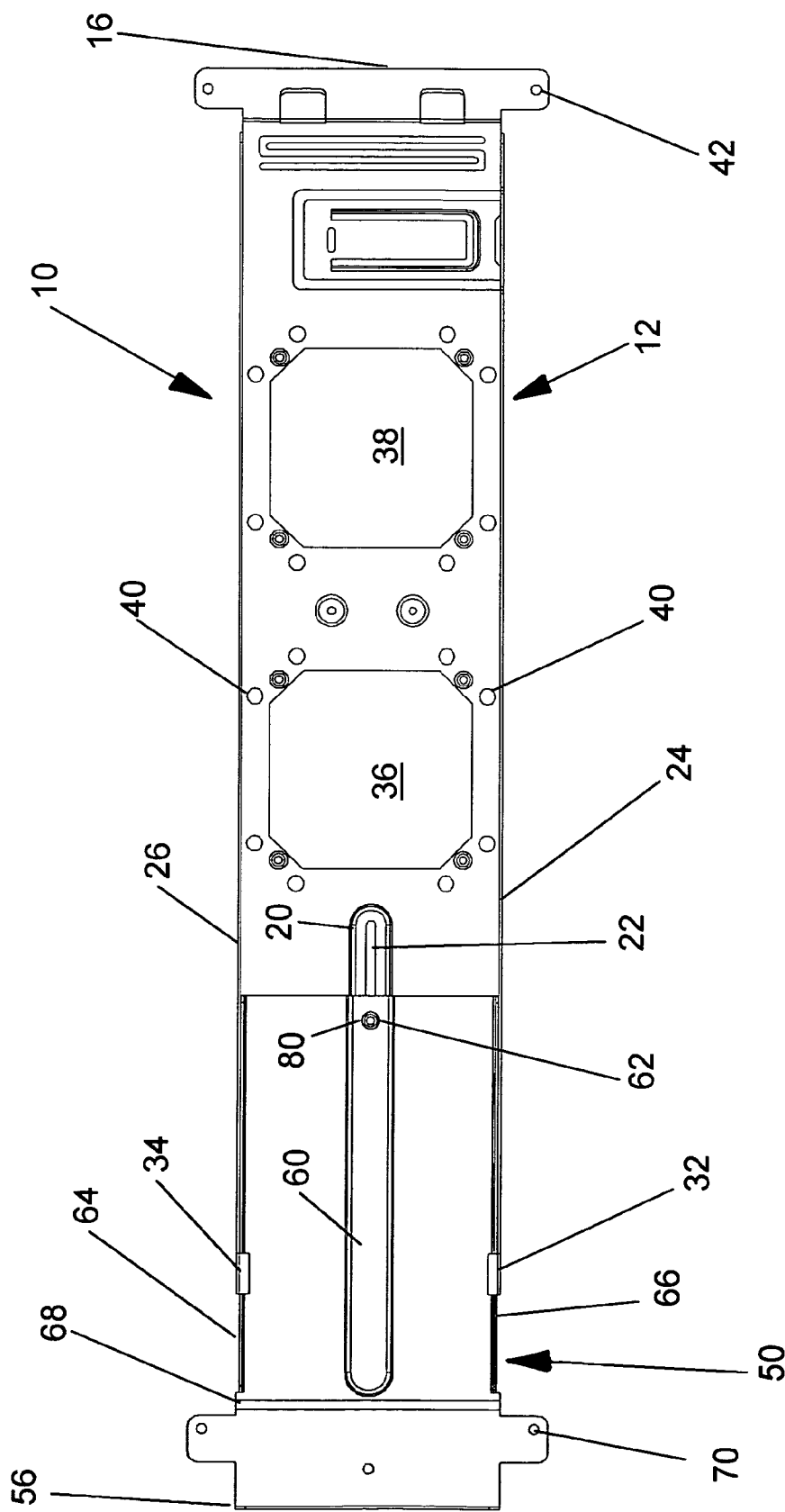
FIG. 5 is a bottom view of the adjustable mounting bracket assembly with the mounting bracket connected to the adapter plate.

FIG. 5 shows the mounting bracket assembly 10 of the present invention with the mounting bracket 12 slidably receiving the adapter plate 50. The aperture 62 for the track 60 is aligned with the slot 22 in the rail 20. In the embodiment illustrated in FIG. 5, the aperture 62 in the track 60 is tapped to provide threads for receiving the fastening screw 80. When the screw 80 is inserted in the slot 22 in the rail 20 (see FIG. 4) and the aperture 62 in the track 60, but before the screw 80 is tightened, the distance between the opposing attaching ends 16, 56 of the mounting bracket assembly 10 can be adjusted by slidably moving the adapter plate 50 between the opening formed by the tabs 32, 34 and side walls 24, 26 of the mounting bracket 12. After the adjustable mounting bracket assembly 10 has been adjusted to the desired position, the fastening screw 80 is tightened to secure the mounting bracket 12 and the adapter plate 50 in a fixed position.

Figure 6:
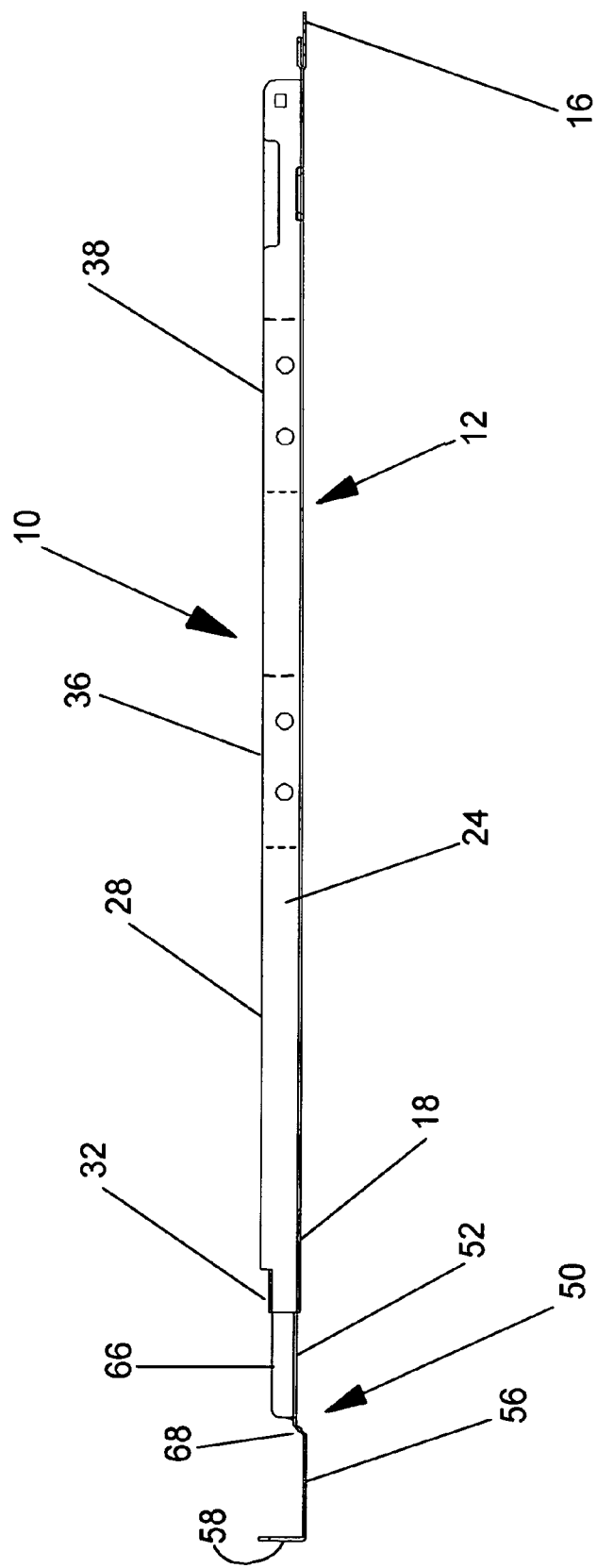
FIG. 6 is a side view of the adjustable mounting bracket assembly with the mounting bracket connected to the adapter plate.

FIG. 6 is a side view of the adjustable mounting bracket assembly 10 which shows the mounting bracket 12 slidably receiving the adapter plate 50. The side wall 24 of the mounting bracket 12 extends beyond the side wall 66 of the adapter plate 50 and the tab 32 extends over the top of the adapter plate side wall 66. The adapter plate 50 includes a connecting wall 68 which connects and offsets the attaching end 56 and the base plate 52. The offset provided by the connecting wall 68 aligns the adapter plate attaching end 56 and the mounting bracket attaching end 16 so that their surfaces are in substantially the same plane. Thus, when the adjustable mounting bracket assembly 10 is attached to two adjoining wall studs, the mounting bracket assembly 10 will be substantially parallel to the surface of the wall.

FIGS. 7A and 7B illustrate how the adjustable mounting bracket assembly 10 can be adjusted for mounting in a vertical configuration between a sole plate 90 and a stud 92. FIG. 7A shows the mounting bracket assembly 10 with the adapter plate attaching end 56 secured to the sole plate 90 of a framed wall and the adapter plate end wall 58 positioned under the sole plate 90. The opposing mounting bracket attaching end 16 is extended (FIG. 7B) until the openings 36, 38 for the electrical boxes are at the desired elevation. FIG. 7B shows how the adjustable mounting bracket assembly 10 is extended and the mounting bracket attaching end 16 is secured to a stud 92.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An adjustable mounting bracket assembly for mounting an electrical box comprising:
   (a) a mounting bracket comprising:
      a substantially flat mounting plate having a first pair of opposing sides, a first opening for receiving an electrical box and a rail having a first aperture;
      a mounting bracket attaching end;
      a mounting bracket mating end; and
      a first pair of opposing sides having a first pair of side walls, wherein the pair of side walls extend downwardly from the opposing sides of the mounting plate to a pair of edges;
   (b) an adapter plate comprising:
      a substantially flat base plate having a pair of opposing sides and a track having a second aperture;
      an adapter plate attaching end;
      an adapter plate mating end; and
      a second pair of side walls extending downwardly from the opposing sides of the base plate; and
   (c) a fastener,
   wherein the mounting bracket mating end slidably mates with the adapter plate mating end so that the first aperture in the rail aligns with the second aperture in the track, and wherein the fastener is inserted in the first and second apertures and tightened to secure the mounting bracket to the adapter plate.

2. The adjustable mounting bracket assembly according to claim 1, wherein the rail extends substantially between the first mating end and the first opening for receiving an electrical box.

3. The adjustable mounting bracket assembly according to claim 1, wherein the track extends substantially between the second mating end and the adapter plate attaching end.

4. The adjustable mounting bracket assembly according to claim 1, wherein the first aperture is a round hole or a slot.

5. The adjustable mounting bracket assembly according to claim 1, wherein the second aperture is a round hole or a slot.

6. The adjustable mounting bracket assembly according to claim 1, wherein the fastener comprises a screw.

7. The adjustable mounting bracket assembly according to claim 1, wherein the fastener is a screw and a nut.

8. The adjustable mounting bracket assembly according to claim 1, wherein the adapter plate attaching end has an adapter plate end wall extending downwardly therefrom.

9. The adjustable mounting bracket assembly according to claim 1, wherein the mounting plate has a first top surface and a first bottom surface and the rail extends downwardly from the first bottom surface and forms a first depression in the first top surface, wherein the adapter plate has a second top surface and a second bottom surface and the track extends downwardly from the second bottom surface and forms a second depression in the second top surface, and wherein the rail and track are dimensioned so that the rail is slidably received by the track when the mounting bracket slidably receives the adapter plate.

10. The adjustable mounting bracket assembly according to claim 1, wherein the mounting bracket attaching end comprises one or more bracket mounting apertures for attaching the mounting bracket to a first structure and the adapter plate attaching end comprises one or more adapter plate mounting apertures for attaching the adapter plate to a second structure.

11. The adjustable mounting bracket assembly according to claim 1, wherein the mounting bracket further comprises a pair of tabs extending inwardly from the edge of each of the first pair of side walls and wherein each of the second pair of side walls of the adapter plate is received between one of the tabs and the mounting plate.

12. The adjustable mounting bracket assembly according to claim 1, wherein the mounting plate further comprises a second opening for receiving an electrical box.

13. The adjustable mounting bracket assembly according to claim 1, wherein the adapter plate further comprises a pair of tabs extending inwardly from the edge of each of the second pair of side walls and wherein each of the first pair of side walls of the mounting bracket is received between one of the tabs and the base plate.

14. The adjustable mounting bracket assembly according to claim 1, wherein the substantially flat base plate is in a first plane and the adapter plate attaching end has a substantially flat surface in a second plane, and wherein the first plane and the second plane are parallel and the base plate is connected to the adapter plate attaching end by a connecting wall.

15. An adjustable mounting bracket assembly for mounting an electrical box comprising:
(a) a mounting bracket comprising:
a substantially flat mounting plate having a pair of opposing sides, a first opening for receiving an electrical box and a rail having a first aperture;
a mounting bracket attaching end;
a mounting bracket mating end, wherein the rail extends substantially between the first opening and the mounting bracket mating end;
a first pair of side walls, wherein the first pair of side walls extend downwardly between the opposing sides and a pair of edges; and
a pair of tabs extending inwardly from the pair of edges;
(b) an adapter plate comprising:
a substantially flat base plate having a pair of opposing sides and a track having a second aperture;
an adapter plate attaching end;
an adapter plate mating end, wherein the track extends substantially between the adapter plate attaching end and the mating end; and
a second pair of side walls extending downwardly from the opposing sides of the base plate; and
(c) a fastener,
wherein the mounting bracket mating end slidably receives the adapter plate mating end so that the first aperture in the rail aligns with the second aperture in the track and each of the second side walls is received between one of the tabs and the mounting plate, and wherein the fastener is inserted in the first and second apertures and tightened to secure the mounting bracket to the adapter plate.

16. The adjustable mounting bracket assembly according to claim 15, wherein the first aperture is a first round hole or a first slot and the second aperture is a second round hole or a second slot.

17. The adjustable mounting bracket assembly according to claim 15, wherein the fastener comprises a screw or a screw and a nut.

18. The adjustable mounting bracket assembly according to claim 15, wherein the mounting plate has a first bottom surface and the rail extends downwardly from the first bottom surface and wherein the adapter plate has a second bottom surface and the track extends downwardly from the second bottom surface and wherein the rail and track are dimensioned so that the rail is slidably received by the track.

19. The adjustable mounting bracket assembly according to claim 15, wherein the mounting plate further comprises a second opening for receiving an electrical box.

20. The adjustable mounting bracket assembly according to claim 15, wherein the rail is formed by a first depression in the mounting plate and the track is formed by a second depression in the adapter plate and wherein the first depression corresponds to the second depression when the mounting bracket slidably receives the adapter plate.

21. The adjustable mounting bracket assembly according to claim 15, wherein the substantially flat base plate is in a first plane and the adapter plate attaching end has a substantially flat surface in a second plane, and wherein the first plane and the second plane are parallel and the base plate is connected to the adapter plate attaching end by a connecting wall.

22. An adjustable mounting bracket assembly for mounting an electrical box comprising:
(a) a mounting bracket comprising:
a substantially flat mounting plate having a pair of opposing sides and an opening for receiving an electrical box and a rail having a first aperture, wherein the first aperture is a first round hole or a first slot;
a mounting bracket attaching end;
a mounting bracket mating end, wherein the rail extends substantially between the first opening and the mounting bracket mating end;
a first pair of side walls, wherein the pair of side walls extend downwardly from the opposing sides of the mounting plate to a pair of edges; and
a pair of tabs extending inwardly from the edge of each of the first pair of side walls;
(b) an adapter plate comprising:
a substantially flat base plate having a pair of opposing sides and a track having a second aperture, wherein the second aperture is a second round hole or a second slot;
an adapter plate attaching end;
an adapter plate mating end, wherein the track extends substantially between the adapter plate attaching end and mating end; and
a second pair of side walls extending downwardly from the opposing sides of the base plate; and
(c) a fastener comprising a screw,
wherein the mounting bracket mating end slidably receives the adapter plate mating end so that the first aperture in the rail aligns with the second aperture in the track and each of the second side walls is received between one of the tabs and the mounting plate, and wherein the fastener is inserted in the first and second apertures and tightened to secure the mounting bracket to the adapter plate.

23. The adjustable mounting bracket assembly according to claim 22, wherein the mounting plate has a first bottom surface and the rail extends downwardly from the first bottom surface and wherein the adapter plate has a second bottom surface and the track extends downwardly from the second bottom surface and wherein the rail and track are dimensioned so that the rail is slidably received by the track.

24. The adjustable mounting bracket assembly according to claim 22, wherein the rail is formed by a first depression in the mounting plate and the track is formed by a second depression in the adapter plate and wherein the first depression corresponds to the second depression when the mounting bracket slidably receives the adapter plate.

25. The adjustable mounting bracket assembly according to claim 22, wherein the substantially flat base plate is in a first plane and the adapter plate attaching end has a substantially flat surface in a second plane, and wherein the first plane and the second plane are parallel and the base plate is connected to the adapter plate attaching end by a connecting wall.

* * * * *